June 3, 1930.  A. B. BLUMENBERG  1,762,046
MOTOR VEHICLE SEAT
Filed Jan. 7, 1929
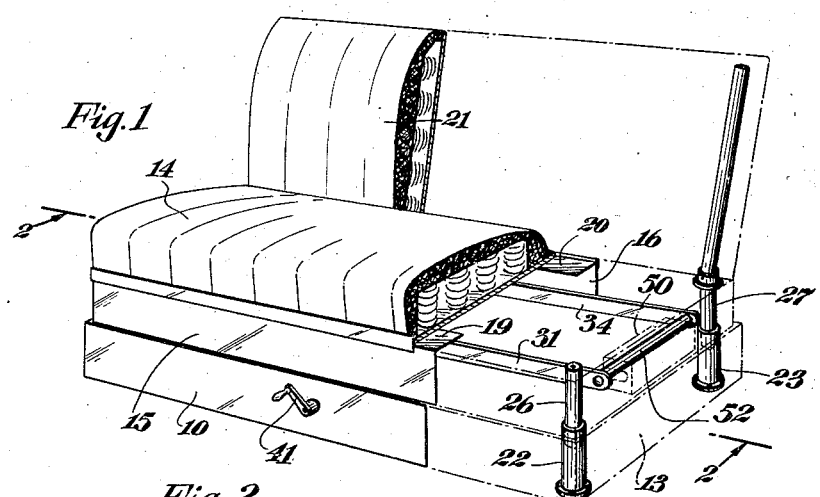
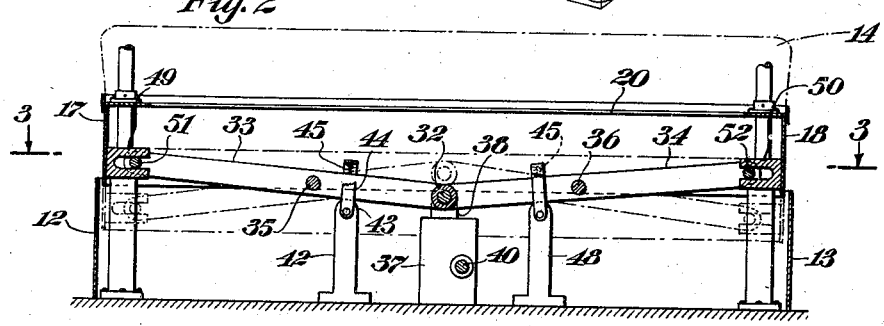
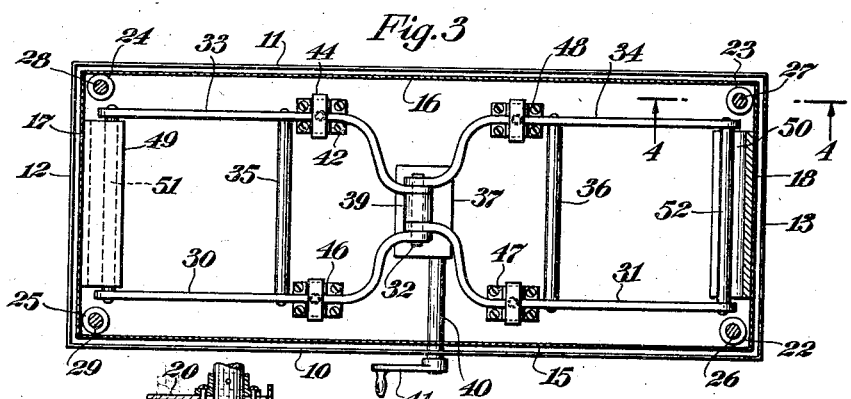
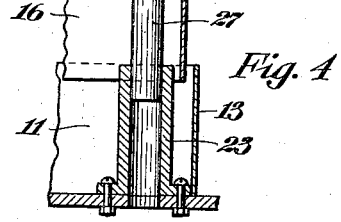
INVENTOR
Albert B. Blumenberg
BY
ATTORNEY Patented June 3, 1930

1,762,046

UNITED STATES PATENT OFFICE

ALBERT B. BLUMENBERG, OF NEW YORK, N. Y.

MOTOR-VEHICLE SEAT

Application filed January 7, 1929. Serial No. 330,721.

My present invention relates generally to motor vehicles, and has particular reference to the seats thereof.

Although my invention is designed primarily for employment with the driver's seat of a motor vehicle, nevertheless it will be understood that as to certain phases of my invention, a limited application of this character is not essential, and that my invention relates in a broader sense to seats in general.

It is an object of my invention to provide a seat, and more particularly, a driver's seat for a vehicle, which may be adjusted to alter the vertical height thereof with respect to a floor board or the like. In this way, the owner or driver of an automobile is enabled to adjust the driver's seat to that particular height which is most comfortable and efficient for his particular purpose.

A more specific object lies in providing such an adjustable seat in a simple and inexpensive manner and departing to a minimum degree from the standard types of construction which are in wide use.

One feature of my invention lies in providing a construction for the foregoing purposes wherein a single control member such as a manually operable crank may be employed for the purpose of adjusting and setting the seat at the desired height.

Another feature lies in providing a device which is of such a nature as to permit the space beneath the seat to be employed very much as it is at present for the purpose of accommodating tools and the like, batteries, etc. A still further feature lies in providing a construction whereby the ordinary type of upholstered seat may be employed, such upholstery including springs for absorbing certain of the shocks due to driving. I also provide means in association with the adjusting mechanism for taking up the shocks which might be imposed upon such mechanism under ordinary conditions of driving.

For the attainment of the foregoing objects and such other objects as may hereinafter appear or be pointed out, I have illustrated one form of my invention in the accompanying drawings wherein—

Figure 1 is a perspective view showing an automobile seat constructed in accordance with my present invention, certain portions being broken away to reveal parts which would otherwise be concealed;

Figure 2 is a front vertical section taken substantially along the line 2—2 of Figure 1;

Figure 3 is a plan view of the operating mechanism taken substantially along the line 3—3 of Figure 2; and Figure 4 is a fragmentary vertical cross-section on a slightly enlarged scale, taken substantially along the line 4—4 of Figure 3.

Mounted upon the floor board or similar supporting structure of the car I provide a hollow base which includes the upstanding front and rear walls 10 and 11 and the upstanding opposite side walls 12 and 13. Mounted in association with this base I provide a seat structure which consists essentially of a framework adapted to support the upholstered seat proper 14. This framework includes the depending front and rear walls 15 and 16 and the depending opposite side walls 17 and 18, all of these walls being so sized and positioned as to telescope within the upstanding walls of the base. At the tops of the walls 15—18 I provide inwardly disposed flanges such as the flanges 19 and 20 seen most clearly in Figure 1, upon which flanges the upholstered seat 14 may be removably applied in a well known manner.

The seat is mounted for vertical adjustment or reciprocation with respect to the base 10, and it is guided in such movement by means of certain cylinder and plunger elements which are most clearly observed in Figures 1, 3, and 4. Within the base and substantially at each corner thereof I provide a set of upstanding cylinders 22, 23, 24, and 25, these cylinders being fixed in position and being preferably secured to the floor board beneath the seat somewhat as shown in Figure 4. Depending from the flanges 19 and 20 I provide a complementary set of plunger elements 26, 27, 28, and 29, these plunger elements being adapted to slide respectively and snugly within the cylinder elements mentioned. Proper lubricating material and lubricating means may be associated with this slidable arrangement.

The rear set of plungers 27 and 28 are extended upwardly and somewhat rearwardly as shown in Figure 1, and into a fixed relationship with the upholstered back 21 of the seat.

To render possible a raising and lowering of the seat to set the same at any desired height above the floor board I provide mechanism beneath the seat and within the base which includes a pair of laterally extending toggle levers 30 and 31. These levers are mutually pivoted at approximately the center of the entire device and preferably by means of a pin 32 arranged with its axis parallel to the side walls 12 and 13. Although one such set of toggle levers might be sufficient if properly designed, I prefer to provide a complementary and opposed set consisting of the levers 33 and 34. A strut 35 connects the levers 30 and 33 and causes them to act as a unit, and a similar strut 36 extends between and connects the levers 31 and 34.

My invention contemplates the rocking of these levers in the manner illustrated in Figure 2, a certain force being applied at the mutually pivoted ends thereof and certain fulcrums being designed and arranged to accomplish such rocking. The mechanism which I prefer to employ consists of a mechanical "jack" of the character widely used for purposes of propping up the automobiles themselves. I have not shown the detailed mechanism of the jack employed by me, because such mechanism is well known by itself. However, I have shown the sleeve 37 which constitutes the fixed portion of the jack, this sleeve or casing being fixedly secured to the floor board within the base 10 and substantially at the center thereof beneath the pin 32. Extending upwardly out of the sleeve 37 is a rod 38 which is suitably articulated to the pin 32 as by means of the hub portion or horizontal sleeve 39. A shaft 40 extends forwardly from the sleeve 37 and outwardly through the front wall 10, at the end of which shaft I provide a manually controllable device such as the hand crank 41. The jack is so constructed and arranged, in accordance with well known practice, that rotation of the hand crank 41 will cause vertical reciprocation of the rod 38, and the leverage which such a device affords need hardly be pointed out.

Beneath a midportion of the lever 33 I provide a fixed fulcrum member 42 having a rounded upper end 43 upon which the lever 33 rests. Extending upwardly from the member 42 and around the lever 33 is a suitable strap 44. Between the uppermost portion of the strap and the upper surface of the lever 33 I provide a compression spring 45. The strap 44 and spring 45 serve to absorb the shocks which might tend to jolt the lever 33 with too great force upwardly from the fulcrum member 42 upon which it is designed to rest. Beneath the other three levers I provide similar fulcrum members as shown at 46, 47, and 48.

Carried by the opposite side walls 17 and 18 and in opposed relationship I provide a pair of channel elements 49 and 50, each of which is substantially U-shaped in cross-section, having the base of the U suitably welded or attached to the lowest portion of the corresponding wall. These channel members open inwardly, i. e., toward each other, and they are adapted to accommodate respectively the pintles 51 and 52. The pintle 51 extends between the free ends of the levers 30 and 33, and the pintle 52 extends between the free ends of the levers 31 and 34.

The operation of my device will be understood from the foregoing description and from the drawings. Manipulation of the hand crank 41 will raise or lower the pin 32. This pin is shown in its lowest position in Figure 2 and is shown in a raised position in dot and dash lines. When this pin is raised, the levers are made to rock from the full-line positions toward the dot and dash positions, and this will have the effect of lowering the seat. Similarly, when the rod 38 and the pin 32 are lowered, the levers will rock to raise the seat. Once the seat is adjusted to any desired height, it will remain at such height without any danger of maladjustment, because of the leverage mechanism arranged within the sleeve 37.

The construction illustrated operates with great efficiency and I wish to point out that the raising or lowering force is converted from an upward and downward movement of a single rod element 38 to an upward and downward pressure along relatively great areas. In other words, the upward and downward actions of the pintles 51 and 52 distribute the force in an efficient manner which prevents jamming. The prevention of jamming is increased further by the provision of the guides at the corners of the construction.

I wish to point out further that the space beneath the seat may be employed in the usual manner for accommodating tools or the like. Although of necessity a certain amount of this space is taken up by the elements of my invention, nevertheless it will be seen from the drawings that a substantial amount of space is still available for the storage of accessories. The upholstered seat 14 may be withdrawn in the usual manner when it is desired to secure access to the space beneath.

I also prefer to provide the hand crank 41 of a character which will render it removable, although I have not specifically illustrated such an arrangement.

It will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. In a motor vehicle, a floor board, a hollow base thereon, a seat mounted in association with said base and provided with depending side walls telescoped within said base, and means for altering said telescoped relationship to adjust the seat to desired heights above the floor board; said means comprising a set of opposed channel elements carried by said walls and beneath said seat, and means engaging within said elements for raising and lowering the same.

2. In a motor vehicle, a floor board, a hollow base thereon, a seat mounted in association with said base and provided with depending side walls telescoped within said base, a pair of opposed inwardly opening channel members carried by two opposite walls, and means for altering said telescoped relationship to adjust the vertical position of said seat, said means comprising a pair of toggle levers, means for vertically reciprocating the mutually pivoted ends of said levers, and pintles carried by the free ends of said levers and engaging within said channel members.

3. In a motor vehicle, a floor board, a hollow base thereon, a seat mounted in association with said base and provided with depending side walls telescoped within said base, a pair of opposed inwardly opening channel members carried by two opposite walls, and means for altering said telescoped relationship to adjust the vertical position of said seat, said means comprising a pair of toggle levers, a fulcrum member beneath and supporting a midportion of each lever, a manually controllable leverage mechanism for raising and lowering the mutually pivoted ends of said levers to rock the latter about said fulcrums, and pintles carried by the free ends of said levers and engaging within said channel members.

4. A motor vehicle including a floor board, a hollow base mounted upon said floor board, cylindrical guide members within said base and a seat mounted over said base, including guide members receivable within said cylindrical members, said seat including a depending portion receivable within said base for telescopic movement therewith, inwardly extending bifurcated members carried by said depending member and means for elevating said seat engaging said bifurcated members.

5. A motor vehicle including a floor board, a hollow base mounted upon said floor board, cylindrical guide members within said base and a seat mounted over said base, including guide members receivable within said cylindrical members, said seat including a depending portion receivable within said base for telescopic movement therewith, inwardly extending bifurcated members carried by said depending member and means for elevating said seat engaging said bifurcated members, said means including intermediately pivoted toggles, a jack for operating the ends of said toggles, and the shaft for operating said jack extending externally of said base.

In witness whereof I have signed this specification this 4th day of January, 1929.

ALBERT B. BLUMENBERG.